(12) United States Patent
Gao

(10) Patent No.: US 9,441,860 B2
(45) Date of Patent: Sep. 13, 2016

(54) DOUBLE-MEDIUM CIRCULATION AIR CONDITIONER FOR COOLING, HEATING AND HUMIDIFYING

(75) Inventor: Shengtang Gao, Zibo (CN)

(73) Assignee: SHANDONG YICUN AIRCONDITIONING CO., LTD., Zibo, Shandong (CN)

( * ) Notice: Subject to any disclaimer, the term of this patent is extended or adjusted under 35 U.S.C. 154(b) by 172 days.

(21) Appl. No.: 14/374,913

(22) PCT Filed: Aug. 7, 2012

(86) PCT No.: PCT/CN2012/001054
§ 371 (c)(1),
(2), (4) Date: Jul. 27, 2014

(87) PCT Pub. No.: WO2013/138962
PCT Pub. Date: Sep. 26, 2013

(65) Prior Publication Data
US 2015/0300696 A1      Oct. 22, 2015

(30) Foreign Application Priority Data

Mar. 21, 2012    (CN) .......................... 2012 1 0075894

(51) Int. Cl.
| | |
|---|---|
| F24J 3/08 | (2006.01) |
| F24F 1/02 | (2011.01) |
| F24F 6/04 | (2006.01) |
| F24F 6/12 | (2006.01) |
| F24F 5/00 | (2006.01) |

(52) U.S. Cl.
CPC ................ *F24J 3/085* (2013.01); *F24F 1/022* (2013.01); *F24F 5/0046* (2013.01); *F24F 6/043* (2013.01); *F24F 6/12* (2013.01); *F24F 2005/0053* (2013.01); *F24F 2005/0057* (2013.01); *Y02B 10/40* (2013.01); *Y02E 10/14* (2013.01)

(58) Field of Classification Search
CPC ........... F24J 3/085; F24J 3/08; F24F 5/0046; F24F 6/12; F24F 1/022; F24F 6/043; F24F 2005/0053; F24F 2005/0057; F24F 5/00; Y02E 10/14; Y02B 10/40
See application file for complete search history.

(56) References Cited

U.S. PATENT DOCUMENTS

| | | | | |
|---|---|---|---|---|
| 4,941,324 A | * | 7/1990 | Peterson | ................. F24F 3/1411 62/271 |
| 5,598,706 A | * | 2/1997 | Bronicki | ................... F03G 7/04 60/641.2 |
| 2007/0169481 A1 | * | 7/2007 | Xu | ......................... F24F 5/0046 60/650 |
| 2011/0101117 A1 | * | 5/2011 | Miyauchi | ........... B01D 53/1425 236/44 A |

FOREIGN PATENT DOCUMENTS

| | | | | |
|---|---|---|---|---|
| JP | 2009036413 A | * | 2/2009 | |
| JP | 2011007476 A | * | 1/2011 | |

* cited by examiner

*Primary Examiner* — Emmanuel Duke

(57) ABSTRACT

A double-medium circulation air conditioner for cooling, heating and humidifying comprises: a machine body having an air inlet and an air outlet provided thereon. A heat exchanging fan, a water circulation system, a refrigerant circulation system, a heat exchanger and a humidification system are provided in the machine body. The heat exchanger comprises a water heat exchanging pipe and a refrigerant heat exchanging pipe, which are winded or overlapped together without communicating with each other. The water circulation system is communicated with the water heat exchanging pipe of the heat exchanger. The refrigerant circulation system is communicated with the refrigerant heat exchanging pipe of the heat exchanger. The water circulation system comprises a downhole exchanger, and the humidification system comprises a humidifying water-storage grill set.

14 Claims, 7 Drawing Sheets

DOUBLE-MEDIUM CIRCULATION AIR CONDITIONER FOR COOLING, HEATING AND HUMIDIFYING

CROSS REFERENCE OF RELATED APPLICATION

This is a U.S. National Stage under 35 U.S.C 371 of the International Application PCT/CN2012/001054, filed Aug. 7, 2012, which claims priority under 35 U.S.C. 119(a-d) to CN 201210075894.1, filed Mar. 21, 2012.

BACKGROUND OF THE PRESENT INVENTION

1. Field of Invention

The present invention relates to a field of indoor temperature regulation equipment, and more particularly to a double-medium circulation air conditioner for cooling, heating and humidifying.

2. Description of Related Arts

The conventional refrigerant circulation air conditioner and water-cooled air conditioner have been widely applied in various fields of social life and production. However, due to limitation of the structure and working principle thereof, the application of the conventional refrigerant circulation air conditioner has both advantages and disadvantages.

Referring to FIG. 1 of the drawings, the refrigerant circulation air conditioner comprises two parts of an indoor part A and an outdoor part B, which is complicated in structure and requires professionals for installation and maintenance. In the air conditioner, a capillary tube 1, a check valve 2, a refrigerant evaporating pipe 3 and an indoor part heat exchanging fan 4 and etc. are provided in the indoor part A, and a four-way valve 9, a liquid storage tank 5, a compressor 6, an outdoor part heat exchanging fan 8 and a refrigerant condenser 7 and etc. are provided in the outdoor part B. Four-way connectors of the four-way valve 9 are respectively connected with the refrigerant evaporating pipe 3, the liquid storage tank 5, the compressor 6 and a first end of the refrigerant condenser 7 via the pipe 10, and a second end of the refrigerant condenser 7 is connected with the refrigerant evaporating pipe 3. The liquid storage tank 5 is connected with the compressor 6. The capillary tube 1 and the check valve 2 are connected in parallel and installed between the refrigerant condenser 7 and the refrigerant evaporating pipe 3.

When this type of air conditioner is processing refrigeration operation, the high pressure gas refrigerant is discharged from the compressor 6 and sent to the refrigerant condenser 7 of the outdoor part B via the pipe 10, so as to process heat dissipation via the outdoor part heat exchanging fan 8 to obtain high pressure liquid refrigerant, then process pressure reducing and throttling through the capillary tube 1, in such a manner that the refrigerant is converted to a low pressure liquid and flows into the refrigerant evaporating pipe 3 of the indoor part A to absorb heat of indoor air via the indoor part heat exchanging fan 4, and then the refrigerant returns back to the compressor 6 outdoor, in such a manner that the object of refrigeration goes round and begin again.

When the refrigerant circulation air conditioner is heating, the refrigerant flows in an opposite direction in the pipe with the flow direction of refrigerant while cooling by the action of the four-way valve 9. Under a low pressure, the gas refrigerant is compressed into a high temperature and high pressure gas, which is then sent into the refrigerant evaporating pipe 3 of the indoor part A to process heat dissipation therein via an indoor part heat exchanging fan, so as to change into a liquid thereafter. The liquid is then processed with pressure reducing and throttling through the capillary tube 1 of the pipe 10, then returns to the refrigerant condenser 7 of the outdoor part B to be processed with heat absorption by the heat exchanging fan 8 of the outdoor part. Then the refrigerant returns back to the compressor to achieve the object of heating continuously. It can be seen from the working principle that this kind of air conditioner processes the heating or cooling operation by dissipating heat outdoor and then absorbing heat indoor via the refrigerant, or otherwise by absorbing heat outdoor and then dissipating heat indoor, and thus the environmental temperature has great influence on the operation of the air conditioner. E.g., in the winter of northern China, when the temperature outdoor is ten degrees centigrade below zero or even tens of degrees centigrade below zero, heating by this type of air conditioner can not achieve satisfying effects, and the reason lies in that the refrigerant in the outdoor part B absorbs heat from the environment in a low efficiency, so that a satisfying heating effect can not be achieved. In addition, in hot summer, since this type of air conditioner dissipates heat outdoors in a low efficiency, cooling effect of the air conditioner is reduced heavily or even fails.

The water-cooled air conditioner as shown in FIG. 2 of the drawings, the structure and working principle thereof are relatively simple. The underground water 14 is directly pumped to the water-evaporator 11 by the water circulating pump 13. Heat of water is dissipated to the locating environment via the heat exchanging fan 12. Since the temperature of the underground water is always in a range of 16~19 degrees centigrade, the effects of cooling in summer and heating in winter can be achieved. However, due to temperature limitation of underground water source, temperature regulating capability of this type of air conditioner while heating is also limited to a certain range, which brings inconvenience to utilization thereof.

Meanwhile, since the air conditioner is only capable of getting a significant effect when being utilized in an enclosed space, the indoor environment is inevitably dry after utilizing the air conditioner for a long time, which is bad for respiratory system of human body and thus affects physical fitness of human beings.

Moreover, the utilization of the conventional air conditioner is manipulated by tact switch or close controller, remote control is difficult to achieve, and the indoor temperature can not be regulated to an adaptable degree in advance, which are problems of the conventional air conditioner to be solved immediately.

Thus, how to adjust for combining the advantages of the two kinds of air conditioners and overcoming disadvantages thereof, so as to further improve the utility of the air conditioners, i.e., achieving the regulating the indoor temperature freely and effectively even under harsh climate conditions, and adjusting humidity while changing the indoor temperature, in such a manner that the objects of controlling both the temperature and the humidity, and remote pre-control are achieved, has been a research focus for technicians in the field.

SUMMARY OF THE PRESENT INVENTION

In order to solve the technical problems, the present invention provides a double-medium circulation air conditioner for cooling, heating and humidifying, so as to regulate temperatures indoors conveniently and effectively.

Accordingly, in order to solve the technical problem, technical solutions provided by the present invention are as follows. A double-medium circulation air conditioner for cooling, heating and humidifying is provided, comprising: a machine body having an air inlet and an air outlet provided thereon, wherein a heat exchanging fan, a water circulation system, a refrigerant circulation system, a heat exchanger and a humidification system are provided in the machine body, wherein the heat exchanger comprises a water heat exchanging pipe and a refrigerant heat exchanging pipe, wherein the water heat exchanging pipe and the refrigerant heat exchanging pipe are winded or overlapped together without communicating with each other, the water circulation system is communicated with the water heat exchanging pipe of the heat exchanger.

The double-medium circulation air conditioner for cooling, heating and humidifying is characterized in that the water circulation system comprises a water circulating pump, an inlet pipe, a water-evaporator, a return pipe and an outlet pipe, wherein a first end of the inlet pipe has a water circulating pump provided thereon and is inserted in underground water source, and a second end thereof is connected with the water-evaporator, the water-evaporator is connected with the return pipe, the return pipe is connected with an inlet end of the water heat exchanging pipe in the heat exchanger, a outlet end of the water heat exchanging pipe is connected with a first end of the outlet pipe, and a second end of the outlet pipe is connected with underground water source and communicated with the inlet pipe;

wherein a downhole heat exchanger is connected between the inlet pipe and the outlet pipe, wherein the downhole heat exchanger is provided below dynamic water level of the underground water source;

wherein the refrigerant circulation system comprises a refrigerant recirculating line, a four-way valve, a refrigerant evaporating pipe, a liquid storage tank and a compressor, wherein a four-way connector of the four-way valve is respectively connected with the refrigerant evaporating pipe, the liquid storage tank, the compressor and a first end of the refrigerant heat exchanging pipe, a second end of the refrigerant heat exchanging pipe is connected with the refrigerant evaporating pipe, the liquid storage tank is connected with the compressor.

The double-medium circulation air conditioner for cooling, heating and humidifying is characterized in that the underground water source comprises a main shaft and an auxiliary shaft, the downhole heat exchanger is provided in the main shaft; a water pump is provided in the main shaft, the water pump is connected with the auxiliary shaft via pipes and is capable of injecting water from the main shaft into the auxiliary shaft.

The double-medium circulation air conditioner for cooling, heating and humidifying is characterized in that a composite enclosure is covered on an external of the compressor, wherein the composite enclosure comprises three layers, which are respectively an acoustic absorbent fabric layer, an acoustic panel layer and a metal shell layer.

The double-medium circulation air conditioner for cooling, heating and humidifying is characterized in that a heat exchanging fan is provided in the air outlet, a water-evaporator and a refrigerant evaporating pipe are provided between the air outlet and the heat exchanging fan.

The double-medium circulation air conditioner for cooling, heating and humidifying is characterized in that the refrigerant circulation system further comprises a capillary tube and a check valve, wherein the capillary tube and the check valve are connected in parallel between the refrigerant heat exchanging pipe and the compressor.

The double-medium circulation air conditioner for cooling, heating and humidifying is characterized in that the refrigerant circulation system further comprises a refrigerant filter, wherein the refrigerant filter is connected between the capillary tube and the compressor.

The double-medium circulation air conditioner for cooling, heating and humidifying is characterized in further comprising a humidification system, wherein the humidification system comprises a humidifying water-storage grill set, a filler pipe, a drain pipe, a water pump and a water tank, wherein the water pump is provided in the water tank, the water pump is provided in the water tank, the water pump is connected with the filter pipe, wherein the filter is communicated with an upper portion of the humidifying water-storage grill set, a lower portion of the humidifying water-storage grill set is connected with the drain pipe, and the drain pipe is connected with a return tank.

The double-medium circulation air conditioner for cooling, heating and humidifying is characterized in that the humidifying water-storage grill set comprises at least three sets of arc-shaped humidifying water-storage grills, each set of humidifying water-storage grill is parallelly provided on a same vertical plane, and ends of each set of the humidifying water-storage grill are communicated via draft tubes, and at least one atomizer is provided in each set of the humidifying water-storage grill.

The double-medium circulation air conditioner for cooling, heating and humidifying is characterized in further comprising a remote control system, wherein the remote control system comprises a signal transmitter, a signal receiver, a signal converter and a master controller, wherein the signal transmitter sends a signal to the signal receiver, and transmits the signal to a master controller via a signal converter, the master controller is communicated with the water circulation system, the refrigerant circulation system and the humidification system.

Beneficial effects of the present invention are as follows.

1. The air conditioner of the present invention combines advantages of both the water-cooled air conditioner and the refrigerant circulation air conditioner, wherein the heat exchanger the heat exchanger replaces an air-cooled heat exchanger of the outdoor part of the conventional refrigerant recycling air conditioner. The refrigerant absorbs or dissipates heat indoors, exchanges heat with underground water to achieve the object of processing heat absorption or heat dissipation in the outdoor part of the conventional air conditioner. Repeating the heat absorption or heat dissipation continuously, the object of heating or cooling is achieved. The utilization of the air conditioner of the present invention is less susceptible to the outdoor temperature, wherein underground water source which has a relatively constant temperature is utilized for heat exchanging with the refrigerant, in such a manner that failure of regulation effect of the air conditioner does not appear even in winter or summer.

2. The air conditioner of the present invention utilizes double-medium for heating or cooling circulation. Users can only turn on the water circulation system for cooling according to requirements, which is capable of saving energy and protecting the environment. Under extremely hot or cold climatic conditions, the temperature can be regulated via the underground water source, so as to regulate indoor temperature to a required temperature. Then the refrigerant circulation system is turned on for processing secondary heating or cooling, which not only has a high efficiency in temperature regulation, but also is more energy saving.

3. The air conditioner of the present invention utilizes the integrated structure without having an outdoor part provided thereon, which is not only convenient for installing and controlling maintenance, but also capable of avoiding refrigerant leakage during secondary moving of the air conditioner for shipment.

4. The underground water source includes a main shaft and an auxiliary shaft. A proper distance is provided between the main shaft and the auxiliary shaft. The downhole heat exchanger is provided in the main shaft. A water pump is provided in the main shaft. The water pump is connected with the auxiliary shaft via pipes and capable of injecting the water in the main shaft into the auxiliary shaft. The water circulation system is a closed internal recycling system, and thus is not influenced by external pressure, in such a manner that motive force required for circulation is decreased and the internal recycling water is not easily polluted, the loss is low, and thus the air conditioner of the present invention has higher energy efficiency compared with the conventional water-cooled air conditioner. Until the radiator processes heat dissipation in the main shaft for a certain time, the water pump injects high temperature water in the main shaft into the auxiliary shaft, the underground water around which has a relatively low temperature refills the main shaft for maintaining the constant low temperature of the main shaft, in such a manner that the downhole heat exchanger has a higher efficiency for heat exchanging.

5. The composite enclosure is coated on an external of the compressor. The composite enclosure comprises the acoustic absorbent fabric layer, the acoustic panel layer and the metal shell layer from inside out. The composite enclosure is capable of blocking out noises generated by operation of the compressor, so as to create a quiet and comfortable indoor living environment.

6. The air conditioner of the present invention further comprises the humidification system, wherein the atomizer in the water-storage grill can be utilized for atomizing water to ultrafine particles having a diameter of 1~5 micrometers according to ultrasonic wave high frequency oscillation principle. The ultrafine particles of water are spread to the air, so as to achieve an object of humidifying the air uniformly. Therefore, the air conditioner of the present invention is capable of controlling both the temperature and the humidity, in such a manner that the living room is more suitable for living, which is beneficial for maintaining physical health of humans. In addition, during utilization of the air conditioner of the present invention, aroma essential oil or concentrated liquid of tradition Chinese medicine can be added into the water tank, in such a manner that effects of medical care, preventing or treating diseases are achieved.

7. In the remote control system of the air conditioner of the present invention, users are capable of sending signals to the signal receiver via a carry-on transmitter, a cell phone for instance. Then the signal is transmitted to the master controller. The master controller is connected with the water circulation system, the refrigerant circulation system and the humidification system, so as to control on/off of the air conditioner, increase or decrease the temperature, humidifying and etc., in such a manner that actual remote control is achieved. In the air conditioner with the remote control system, temperature of the living room can be set previously, in such a manner that users are capable of enjoying a comfortable living environment after going home from outside, and thus the design is more humanized.

8. A refrigerant filter is installed between the capillary tube and the refrigerant evaporating pipe for filtering impurities in the refrigerant, so as to keep the refrigerant circulation system clean, in such a manner that the refrigerant can be processed with liquidation or vaporization, so as to prolong the service life of the air conditioner.

9. The air conditioner of the present invention has characteristics of simple in structure, flexible and convenient in utilization, high efficiency, low in manufacturing cost, and good practicability, and thus is suitable for popularizing in the field.

These and other objectives, features, and advantages of the present invention will become apparent from the following detailed description, the accompanying drawings, and the appended claims.

REFERENCE NUMBERS OF ELEMENTS IN THE FIGS

A—indoor part; B—outdoor part

1—capillary tube; 2—check valve; 3—refrigerant evaporating pipe; 4—indoor part heat exchanging fan; 5—liquid storage tank; 6—compressor; 7—refrigerant condenser; 8—outdoor part heat exchanging fan; 9—four-way valve; 10—pipe, 11—water-evaporator; 12—heat exchanging fan; 13—water circulating pump; 14—underground water source; 15—refrigerant filter; 16—return pipe; 17—main shaft; 18—inlet pipe; 19—outlet pipe; 20—water heat exchanging pipe; 21—heat exchanger; 22—refrigerant heat exchanging pipe; 23—refrigerant recirculating line; 24—auxiliary shaft; 25—water-storage grill; 26—atomizer; 27—draft tube; 28—drain; 29—water tank; 30—water pump; 31—filler pipe; 32—humidifying water-storage grill set; 33—downhole heat exchanger; 34—water pump; 35—machine body; 36—air outlet; 37—air inlet; 38—composite enclosure; 39—acoustic absorbent fabric layer; 40—acoustic panel layer; 41—metal shell layer; 42—signal transmitter; 43—signal receiver; 44—signal converter; 45—master controller

DETAILED DESCRIPTION OF THE PREFERRED EMBODIMENT

Further description of the present invention is illustrated combining with the accompanying drawings and the preferred embodiments as follows.

Embodiment 1

Figure 1:
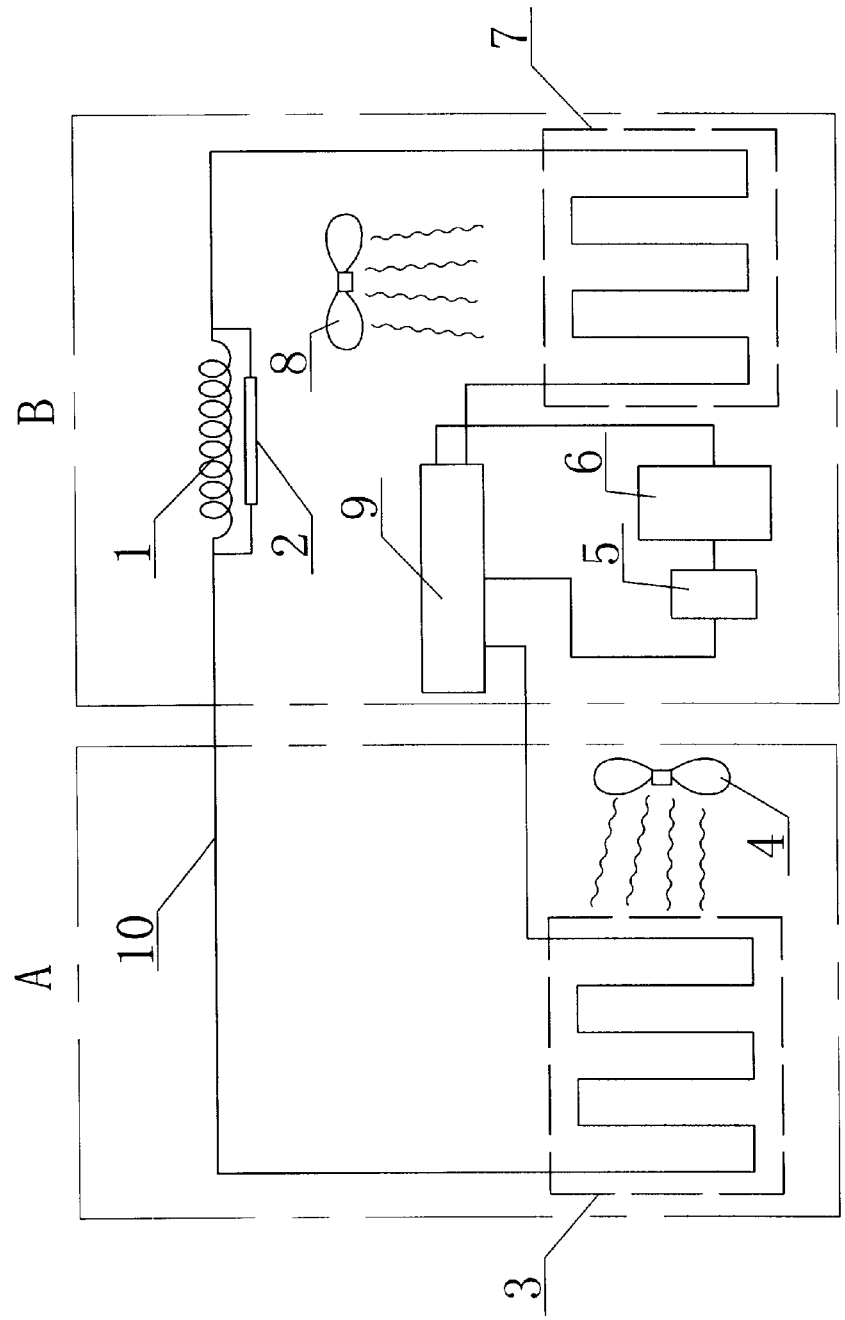
FIG. 1 is a working principle diagram of a conventional refrigerant circulation air conditioner.
Figure 2:
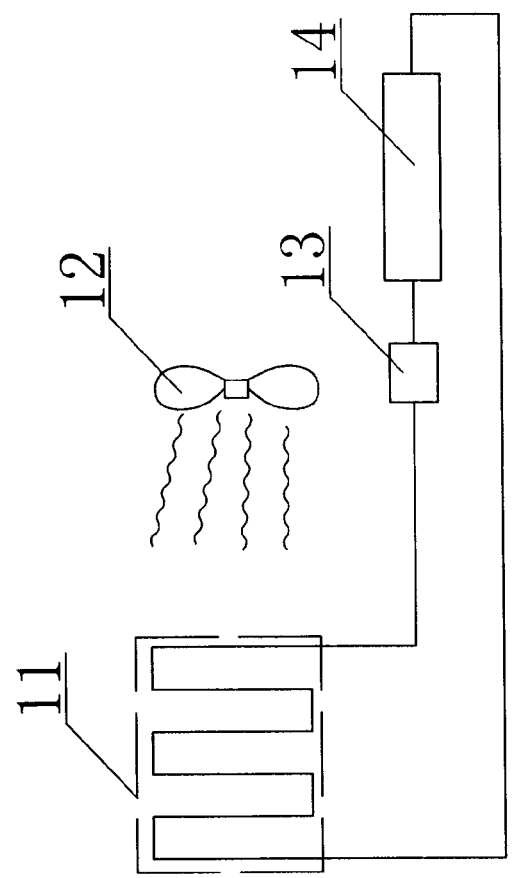
FIG. 2 is a working principle diagram of a conventional water-cooled air conditioner.
Figure 3:
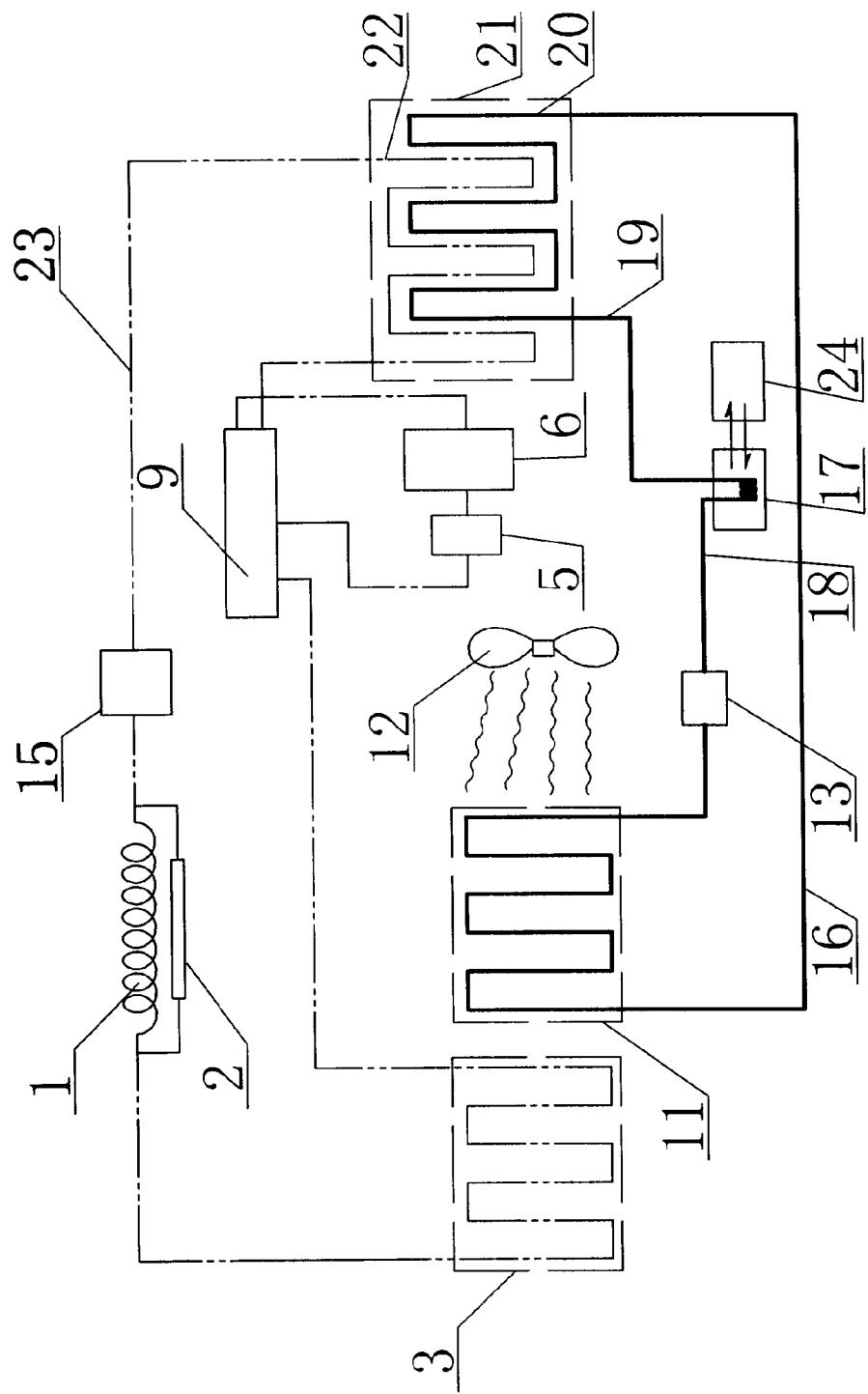
FIG. 3 is a working principle diagram of a double-medium circulation system according to a preferred embodiment of the present invention.
Figure 6:
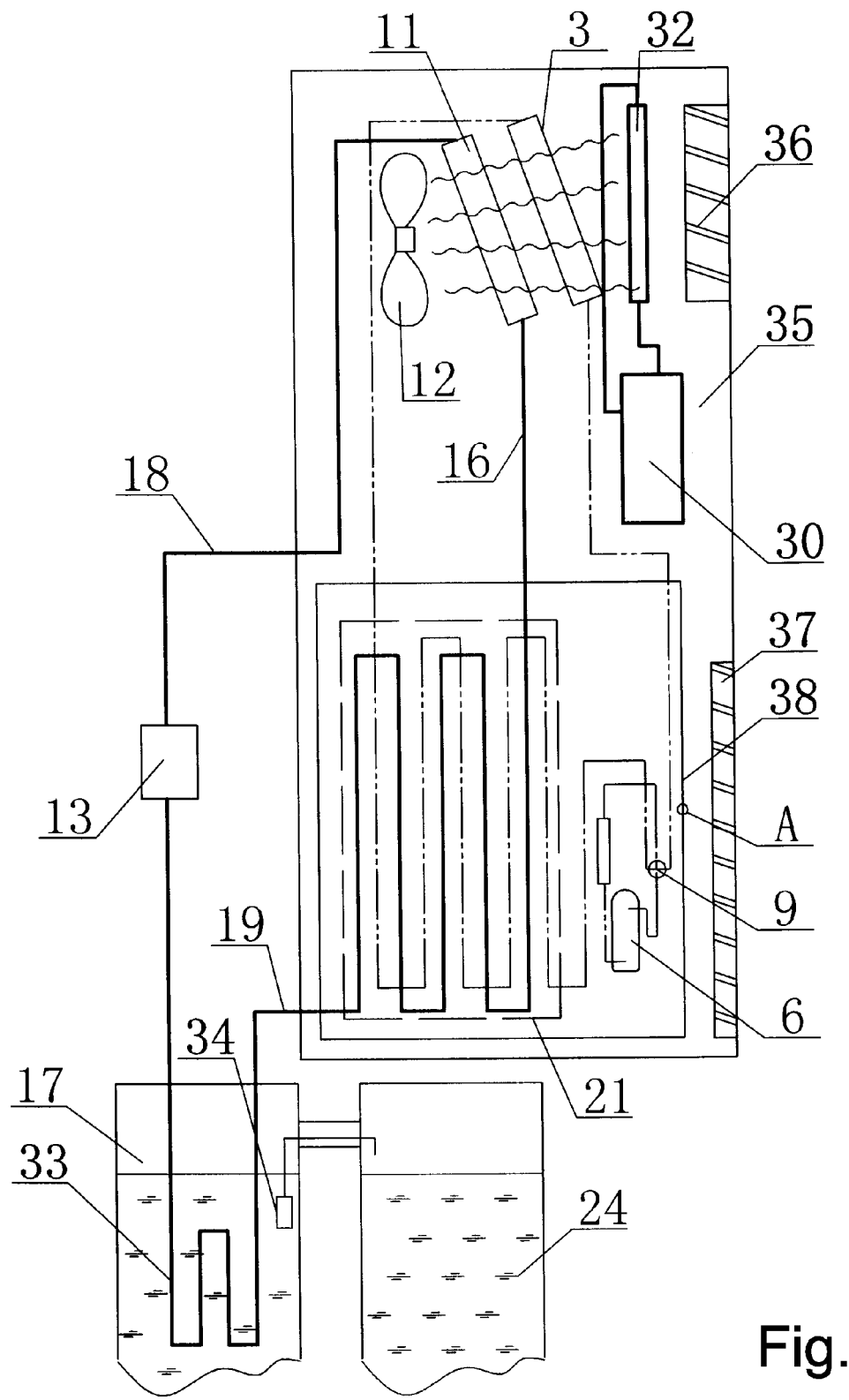
FIG. 6 is a structural schematic view of a double-medium circulation air conditioner according to a preferred embodiment of the present invention.

Referring to FIG. 3 and FIG. 6 of the drawings, a double-medium circulation air conditioner for cooling, heating and humidifying according to a preferred embodiment of the present invention, comprises a machine body 35, wherein two separate systems: a water circulation system and a refrigerant circulation system are provided in the machine body 35. Furthermore, a set of heat exchanger 21 is provided in the air conditioner, and a water heat exchanging pipe 20 and a refrigerant heat exchanging pipe 22 are provided in the heat exchanger 21. The water heat exchanging pipe 20 and the refrigerant heat exchanging pipe 22 are winded or overlapped together without communicating with each other.

Lines of the water circulation system are indicated as thick lines in FIG. 3 and FIG. 6 of the drawings. A water circulating pump 13 is provided on an inlet pipe 18 of the water circulation system. A first end of the inlet pipe 18 is connected with a water-evaporator 11. The water-evaporator 11 is connected with a return pipe 16. The return pipe 16 is connected with an inlet of the heat exchanging pipe 20 of the heat exchanger 21, and an outlet of the heat exchanging pipe 20 is connected with a first end of an outlet pipe 19, a second end of the outlet pipe 19 is connected with a radiator 33, and the radiator 33 is connected with a second end of the inlet pipe 18. The radiator 33 is provided in a main shaft 17 of an underground water source 14 and below a dynamic water level. A water pump 34 is provided in the main shaft 17. The water pump 34 is connected with an auxiliary shaft 24 through pipelines and capable of injecting water from the main shaft 17 into the auxiliary shaft 24. The water circulation system is a closed internal recycling system.

Figure 4:
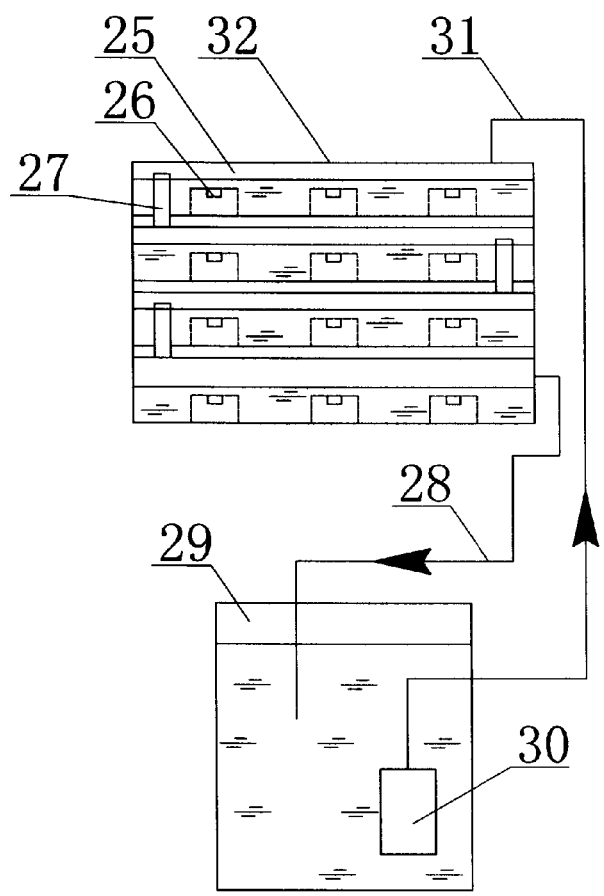
FIG. 4 is a structural schematic view of a humidification system according to a preferred embodiment of the present invention.

Lines of the refrigerant circulation system are indicated as dotted lines in FIG. 3 and FIG. 4 of the drawings. The refrigerant circulation system has a four-way valve 9 provided therein. Four-way connector of the four-way valve is respectively connected with a refrigerant evaporating pipe 3, a liquid storage tank 5, a compressor 6 and a first end of the refrigerant heat exchanging pipe 22. A second end of the heat exchanging pipe 22 is connected with the refrigerant evaporating pipe 3. The liquid storage tank 5 is connected with the compressor 6. A capillary tube 1 and a check valve 2 are connected in parallel between the refrigerant heat exchanging pipe 22 and the refrigerant evaporating pipe 3. A refrigerant filter 15 is provided between the capillary tube 1 and the refrigerant evaporating pipe 3.

Figure 7:
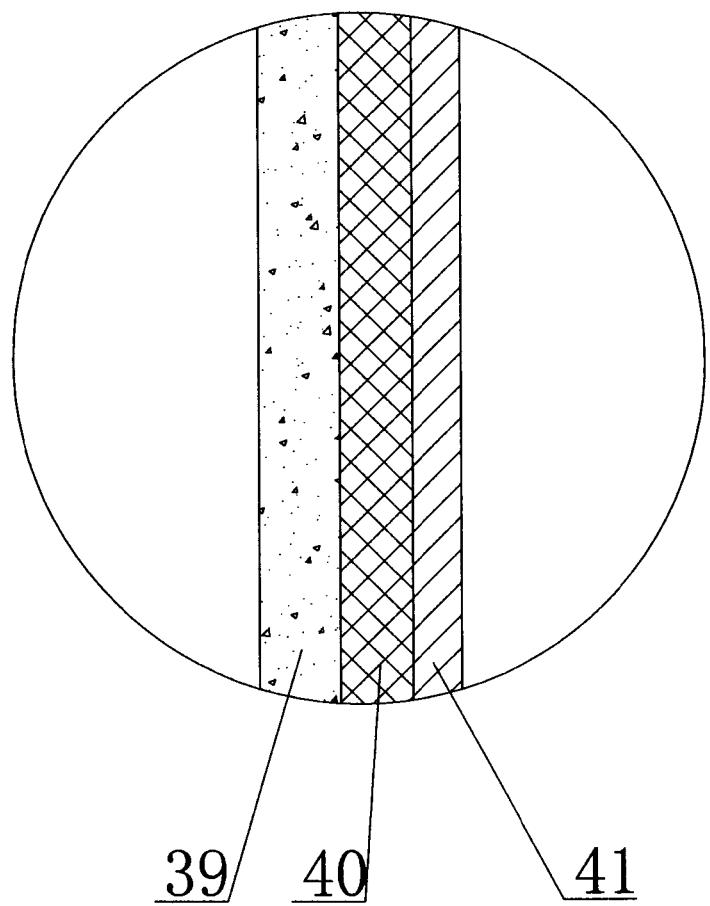
FIG. 7 is an enlarged view of a part A in the FIG. 6.

As shown in FIG. 6 of the drawings, a composite enclosure 38 is covered on an external of the compressor 6. As shown in FIG. 7 of the drawings, the composite enclosure 38 comprises an acoustic absorbent fabric layer 39, an acoustic panel layer 40 and a metal shell layer 41 from inside out. The composite enclosure 38 is capable of effectively blocking out noises generated by the operation of the compressor 6. An upper portion of the machine body 35 has an air inlet 37 and an air outlet 36 provided therein. A heat exchanging fan 12 is provided in the air outlet 36. A water-evaporator 11 and a refrigerant evaporating pipe 3 are provided between the air outlet 36 and the heat exchanging fan 12.

When the air conditioner of the present invention is in utilization, the water circulation system can be turned on individually for processing cooling operation, and working principle thereof is the same as the conventional water-cooled air conditioner. In addition, the two sets of systems can also be turned on simultaneously according to requirements, so as to processing heating or cooling operation high efficiently. Therefore, taking the example of turning on the two systems simultaneously for processing cooling operation, working principle and working process of the air conditioner of the present invention are briefly illustrated as follows.

During the cooling operation of the air conditioner, a water circulating pump 13 of the water circulation system 33 drives cold water in the downhole heat exchanger 33 to pass through the inlet pipe 18 and enter the water-evaporator 11. The heat exchanging fan 12 drives airflow to pass through the water-evaporator 11, so as to blow the cold air into the indoors for achieving cooling effect. Then the recycled water flows into the water heat exchanging pipe 20 of the downhole heat exchanger form the return pipe 16, so as to flow back to the downhole heat exchanger 33 for processing heat exchange with water in the main shaft 17, so as to process heat elimination and temperature reduction to achieve operation of the water circulation system.

Meanwhile, the compressor 6 of the refrigerant circulation system discharges high temperature and high pressure gas refrigerant, which is then sent to the refrigerant heat exchanging pipe 22 through the refrigerant recirculating line 23. The refrigerant is processing heat exchanging with the water heat exchanging pipe 20 of the heat exchanger 21 while circulating in the heat exchanging pipe, Meanwhile, the compressor 6 of the refrigerant circulation system discharges high temperature and high pressure gas refrigerant, which is then sent to the refrigerant heat exchanging pipe 22 through the refrigerant recirculating line 23. The refrigerant is processing heat exchanging with the water heat exchanging pipe 20 of the heat exchanger 21 while circulating in the heat exchanging pipe, i.e., utilizing the recycled water to take away heat exchanging with indoor air, so as to be dissipated in the main shaft 17. After heat dissipation, the refrigerant turns into high pressure liquid, and then turns into low pressure liquid by pressure reducing and throttling of the capillary tube 1, so as to flow into the refrigerant evaporating pipe 3, absorb heat of indoor air via the heat exchanging fan 12, then return to the compressor 6, in such a manner that the object of cooling continuously is achieved.

During the process mentioned above, a critical step is the heat exchanging step of the heat exchanger 21. Since in hot season, the underground water in the main shaft 17 is far below the environmental temperature outdoors of 30~40° C. Thus, the heat dissipation and temperature reduction effects of the refrigerant in the heat exchanger 21 are far better than the effects thereof in the outdoor part of the conventional air conditioner, and thus the cooling effects of the air conditioner of the present invention are far better than the conventional air conditioner.

The principle and process for the two systems to process heating is similar to the principle and process during cooling. The difference lies in that under the effect of the four-way valve 9, flow direction of the refrigerant is in the opposite direction with the direction thereof while cooling. Under a condition of low pressure, the gas refrigerant is compressed into a high temperature and high pressure gas refrigerant by the compressor 6, sent to the refrigerant evaporating pipe 3, processed with heat dissipation indoors via the heat exchanging fan 12 to form a liquid, then processed with pressure reducing and throttling by the capillary tube 1, so as to return back to the refrigerant heat exchanging pipe 22. The refrigerant processes heat exchanging with the water heat exchanging pipe 20 of the heat exchanger 21 while circulating in the refrigerant heat exchanging pipe 22, so as to carry off cooling capacity discharged indoors, and then discharges the cooling capacity to underground well by the downhole heat exchanger 33 in the main shaft. Finally, the refrigerant returns to the compressor 6, so as to achieve an object of heating continuously. Since in cold season, temperature of the underground water is far higher than the environment temperature outdoors of ten degrees centigrade below zero or even tens of degrees centigrade below zero. Thus, the refrigerant has a better heat absorption effect when provided in the heat exchanger 21, which is far better than the effect thereof when provided in the outdoor part of the conventional air conditioner, and thus the heating capability of the air conditioner in the present invention is far better than thereof the conventional air conditioners.

During the utilization of the present invention, in order to achieve a better effect, the water pump 34 communicated between the main shaft 17 and the auxiliary shaft 24 can be turned on regularly, so as to inject the water which is warmed by heat exchanging into the auxiliary shaft 24, wherein underground water which has a relatively low temperature around the main shaft 17 refills the main shaft 17, in such a manner that the main shaft 17 maintains in a constant temperature, and that the heat exchanging effect of the radiator 33 is higher.

Embodiment 2

Figure 5:
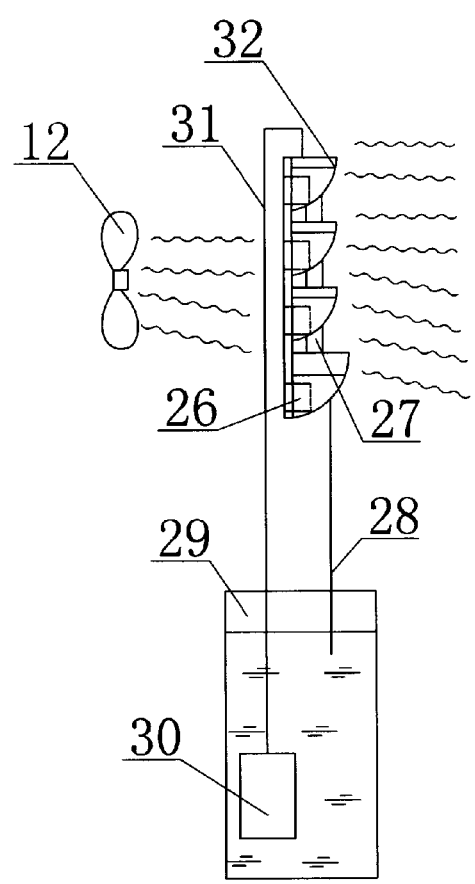
FIG. 5 is a side structure view of the humidification system according to the preferred embodiment of the present invention.

Referring to FIG. 4 and FIG. 5 of the drawings, on the basis of the embodiment 1, the air conditioner of the embodiment 2 further comprises a humidification system. Four arc water-storage grills 25 are provided in the humidifying water-storage grill set 32. All the water-storage grills 25 are provided in parallel on a same vertical plane, and heads and tails of the water-storage grills are communicated by a draft tube 27. Each water-storage grill 25 has three atomizers provided therein. A water pump 30 of the humidification system is provided in a water tank 29, the water thank 30 is connected with a filler pipe 31. The filler pipe 31 is communicated with an upper portion of the humidifying water-storage grill set 32, a lower portion of the humidifying water-storage grill set 32 is connected with a drain 28, and the drain 28 is connected with the water tank 29.

When the air conditioner of the present invention is in use, the water pump 30 injects liquid in the water tank 29 into a first water-storage grill 25. When one water-storage grill is filled, the liquid flows into a water-storage grill below, and flow direction is in a shape of "S". Until water level of all of the water-storage grills exceeds the atomizer 26, the atomizer 26 begins to work, so as to atomize water to ultrafine particles utilizing principle of ultrasonic wave high frequency oscillation principle. The ultrafine particles of water are spread to the air, so as to achieve an object of humidifying the air uniformly.

Furthermore, different kinds of aroma essential oil and concentrated liquid of tradition Chinese medicine can be added into the water tank 29, so as to achieve an object of medical care.

The atomizer mentioned above is mature product in the market, which is convenient for purchasing, and the structures and principles are not covered here.

Embodiment 3

Figure 8:
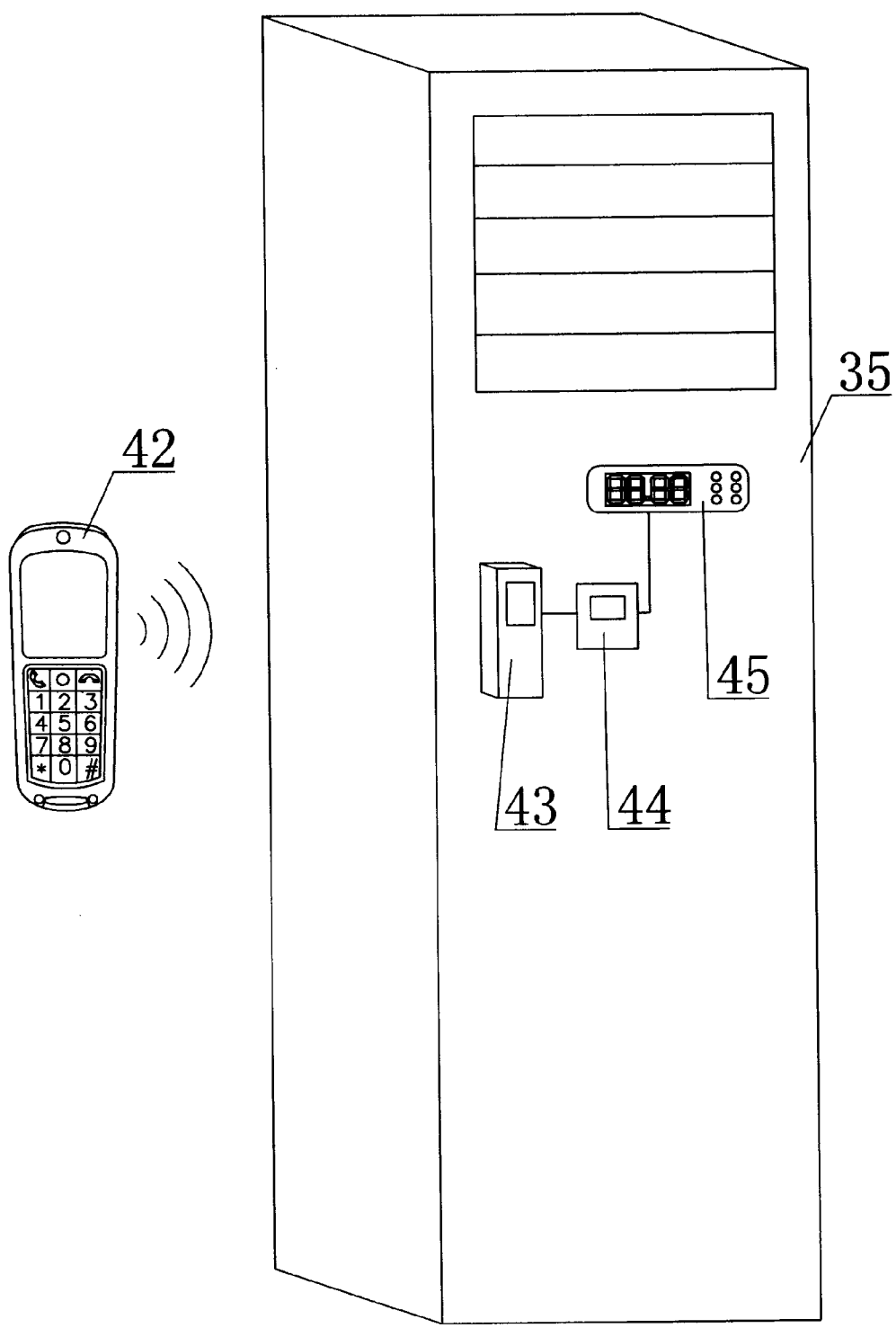
FIG. 8 is a structural schematic view of a remote control system according to a preferred embodiment of the present invention.

Referring to FIG. 8 of the drawings, the air conditioner in the embodiment 3 further comprises a remote control system. The signal transmitter 42 of the remote control system, a cell phone for instance, sends a signal to a signal receiver 43 provided in the machine body 35. The signal is transmitted to a main controller 45 via a signal converter 44. The main controller 45 is communicated with a water circulation system, a refrigerant circulation system and a humidification system, in such a manner that actual remote control is achieved. In the air conditioner with the remote control system, temperature of the living room can be set previously, in such a manner that users are capable of enjoying a comfortable living environment after going home from outside, and thus the humanized design is convenient for utilization.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A double-medium circulation air conditioner for cooling, heating and humidifying, comprising: a machine body having an air inlet and an air outlet provided thereon, wherein a heat exchanging fan, a water circulation system, a refrigerant circulation system, a heat exchanger and a humidification system are provided in the machine body, wherein the heat exchanger comprises a water heat exchanging pipe and a refrigerant heat exchanging pipe, wherein the water heat exchanging pipe and the refrigerant heat exchanging pipe are winded or overlapped together without communicating with each other, the water circulation system is communicated with the water heat exchanging pipe of the heat exchanger; wherein the water circulation system comprises a water circulating pump, an inlet pipe, a water-evaporator, a return pipe and an outlet pipe, wherein a first end of the inlet pipe has a water circulating pump provided thereon and is inserted in underground water source, and a second end thereof is connected with the water-evaporator, the water-evaporator is connected with the return pipe, the return pipe is connected with an inlet end of the water heat exchanging pipe in the heat exchanger, an outlet end of the water heat exchanging pipe is connected with a first end of the outlet pipe, and a second end of the outlet pipe is connected with underground water source and communicated with the inlet pipe; wherein a downhole heat exchanger is connected between the inlet pipe and the outlet pipe, wherein the downhole heat exchanger is provided below dynamic water level of the underground water source; wherein the refrigerant circulation system comprises a refrigerant recirculating line, a four-way valve, a refrigerant evaporating pipe, a liquid storage tank and a compressor, wherein a four-way connector of the four-way valve is respectively connected with the refrigerant evaporating pipe, the liquid storage tank, the compressor and a first end of the refrigerant heat exchanging pipe, a second end of the refrigerant heat exchanging pipe is connected with the refrigerant evaporating pipe, the liquid storage tank is connected with the compressor; and wherein the humidification system comprises a humidifying water-storage grill set, a filler pipe, a drain pipe, a water pump and a water tank, wherein the water pump is provided in the water tank, the water pump is provided in the water tank, the water pump is connected with the filter pipe, wherein the filter is communicated with an upper portion of the humidifying water-storage grill set, a lower portion of the humidifying water-storage grill set is connected with the drain pipe, and the drain pipe is connected with a return tank.

2. The double-medium circulation air conditioner for cooling, heating and humidifying, as recited in claim 1, wherein the underground water source comprises a main shaft and an auxiliary shaft, the downhole heat exchanger is provided in the main shaft; a water pump is provided in the main shaft, the water pump is connected with the auxiliary shaft via pipes and is capable of injecting water from the main shaft into the auxiliary shaft.

3. The double-medium circulation air conditioner for cooling, heating and humidifying, as recited in claim 2, wherein a composite enclosure is covered on an external of the compressor, wherein the composite enclosure comprises three layers, which are respectively an acoustic absorbent fabric layer, an acoustic panel layer and a metal shell layer.

4. The double-medium circulation air conditioner for cooling, heating and humidifying, as recited in claim 3, wherein a heat exchanging fan is provided in the air outlet, a water-evaporator and a refrigerant evaporating pipe are provided between the air outlet and the heat exchanging fan.

5. The double-medium circulation air conditioner for cooling, heating and humidifying, as recited in claim 4, wherein the refrigerant circulation system further comprises a refrigerant filter, wherein the refrigerant filter is connected between the capillary tube and the compressor.

6. The double-medium circulation air conditioner for cooling, heating and humidifying, as recited in claim 5, wherein the refrigerant circulation system further comprises a refrigerant filter, wherein the refrigerant filter is connected between the capillary tube and the compressor.

7. The double-medium circulation air conditioner for cooling, heating and humidifying, as recited in claim 2, wherein a heat exchanging fan is provided in the air outlet, a water-evaporator and a refrigerant evaporating pipe are provided between the air outlet and the heat exchanging fan.

8. The double-medium circulation air conditioner for cooling, heating and humidifying, as recited in claim 7, wherein the refrigerant circulation system further comprises a capillary tube and a check valve, wherein the capillary tube and the check valve are connected in parallel between the refrigerant heat exchanging pipe and the compressor.

9. The double-medium circulation air conditioner for cooling, heating and humidifying, as recited in claim 8, wherein the refrigerant circulation system further comprises a refrigerant filter, wherein the refrigerant filter is connected between the capillary tube and the compressor.

10. The double-medium circulation air conditioner for cooling, heating and humidifying, as recited in claim 1, wherein a heat exchanging fan is provided in the air outlet, a water-evaporator and a refrigerant evaporating pipe are provided between the air outlet and the heat exchanging fan.

11. The double-medium circulation air conditioner for cooling, heating and humidifying, as recited in claim 10, wherein the refrigerant circulation system further comprises a capillary tube and a check valve, wherein the capillary tube and the check valve are connected in parallel between the refrigerant heat exchanging pipe and the compressor.

12. The double-medium circulation air conditioner for cooling, heating and humidifying, as recited in claim 11, wherein the refrigerant circulation system further comprises a refrigerant filter, wherein the refrigerant filter is connected between the capillary tube and the compressor.

13. The double-medium circulation air conditioner for cooling, heating and humidifying, as recited in claim 1, wherein the humidifying water-storage grill set comprises at least three sets of arc-shaped humidifying water-storage grills, each set of humidifying water-storage grill is horizontally provided on a same vertical plane, and ends of each set of the humidifying water-storage grill are communicated via draft tubes, and at least one atomizer is provided in each set of the humidifying water-storage grill.

14. The double-medium circulation air conditioner for cooling, heating and humidifying, as recited in claim 13, further comprising a remote control system, wherein the remote control system comprises a signal transmitter, a signal receiver, a signal converter and a master controller, wherein the signal transmitter sends a signal to the signal receiver, and transmits the signal to a master controller via a signal converter, the master controller is communicated with the water circulation system, the refrigerant circulation system and the humidification system.

* * * * *